US008676977B2

(12) United States Patent
Farahmand et al.

(10) Patent No.: US 8,676,977 B2
(45) Date of Patent: Mar. 18, 2014

(54) METHOD AND APPARATUS FOR CONTROLLING TRAFFIC ENTRY IN A MANAGED PACKET NETWORK

(75) Inventors: Fardad Farahmand, Wellesley, MA (US); Tolga Asveren, Bordentown, NJ (US); Nagesh Kumar Bollapalli, Bangalore (IN)

(73) Assignee: Sonus Networks, Inc., Westford, MA (US)

( * ) Notice: Subject to any disclaimer, the term of this patent is extended or adjusted under 35 U.S.C. 154(b) by 1037 days.

(21) Appl. No.: 12/637,084

(22) Filed: Dec. 14, 2009

(65) Prior Publication Data

US 2011/0145639 A1 Jun. 16, 2011

(51) Int. Cl.
*G06F 15/173* (2006.01)
(52) U.S. Cl.
USPC ............................ 709/226; 709/200; 709/224
(58) Field of Classification Search
USPC .......................................... 709/200, 224, 226
See application file for complete search history.

(56) References Cited

U.S. PATENT DOCUMENTS

| | | | |
|---|---|---|---|
| 6,633,761 B1 | 10/2003 | Singhal et al. | |
| 7,464,303 B2 | 12/2008 | Barsness et al. | |
| 7,719,971 B1 * | 5/2010 | Issa | 370/230 |
| 7,779,416 B2 * | 8/2010 | Koga et al. | 718/105 |
| 7,788,380 B2 * | 8/2010 | Shim et al. | 709/226 |
| 8,059,678 B1 * | 11/2011 | Medhat | 370/466 |
| 8,064,342 B2 * | 11/2011 | Badger | 370/230 |
| 8,089,972 B2 * | 1/2012 | Terpstra et al. | 370/401 |
| 8,332,514 B2 * | 12/2012 | Qiu et al. | 709/226 |
| 2003/0105903 A1 | 6/2003 | Garnett et al. | |
| 2003/0108000 A1 | 6/2003 | Chaney et al. | |
| 2003/0108002 A1 | 6/2003 | Chaney et al. | |
| 2004/0088424 A1 * | 5/2004 | Park et al. | 709/229 |
| 2005/0015492 A1 * | 1/2005 | Kumbalimutt et al. | 709/226 |
| 2006/0064478 A1 * | 3/2006 | Sirkin | 709/223 |
| 2006/0112170 A1 * | 5/2006 | Sirkin | 709/217 |
| 2006/0146792 A1 * | 7/2006 | Ramachandran et al. | 370/352 |
| 2007/0220323 A1 * | 9/2007 | Nagata | 714/13 |
| 2008/0084877 A1 * | 4/2008 | Brzozowski | 370/389 |
| 2008/0101335 A1 * | 5/2008 | Badger | 370/352 |
| 2008/0144609 A1 | 6/2008 | Kim et al. | |
| 2008/0275943 A1 * | 11/2008 | Grayson et al. | 709/203 |
| 2009/0070406 A1 * | 3/2009 | Terpstra et al. | 709/203 |
| 2009/0089699 A1 * | 4/2009 | Saha et al. | 715/771 |
| 2009/0125625 A1 * | 5/2009 | Shim et al. | 709/226 |
| 2009/0245113 A1 * | 10/2009 | Kamiya | 370/238 |
| 2009/0282137 A1 * | 11/2009 | Qiu et al. | 709/223 |
| 2009/0300182 A1 * | 12/2009 | Ueno et al. | 709/226 |
| 2010/0036954 A1 * | 2/2010 | Sakata et al. | 709/226 |

(Continued)

*Primary Examiner* — Anthony Mejia
(74) *Attorney, Agent, or Firm* — Straub & Pokotylo; Michael P. Straub; Stephen T. Straub (57) ABSTRACT

A method for control of real-time traffic entry of a managed packet network includes the step of receiving, from a border element processor, a first message indicative of a new active registration request associated with a client. The border element processor is one of a plurality of border element processors at an edge of a managed packet network controlling packets (e.g., relating to real-time multimedia traffic) entering the managed packet network. The method also includes the step of load balancing, by a load balancing engine, the new active registration request across the plurality of border element processors and assigning the client to a designated border element processor. A second message is generated in response to the new activation registration request. The second message includes a parameter identifying the designated border element processor assigned to the client.

27 Claims, 6 Drawing Sheets

(56) References Cited

U.S. PATENT DOCUMENTS

| | | | |
|---|---|---|---|
| 2010/0211677 A1* | 8/2010 | Issa | 709/224 |
| 2011/0093584 A1* | 4/2011 | Qiu et al. | 709/224 |
| 2011/0119325 A1* | 5/2011 | Paul et al. | 709/203 |
| 2012/0036273 A1* | 2/2012 | Badger | 709/227 |

* cited by examiner

METHOD AND APPARATUS FOR CONTROLLING TRAFFIC ENTRY IN A MANAGED PACKET NETWORK

FIELD OF THE INVENTION

The invention generally relates to the control of traffic entering a managed packet network. The invention also relates to control of traffic entry by load balancing registrations of clients using a load balancing engine within the managed packet network.

BACKGROUND OF THE INVENTION

Multimedia operators can deploy networks over which real-time traffic (e.g., voice data, video or multimedia) is carried with desired quality of service. The networks can include border elements that act as gates for packets passing into and out of the managed packet network. A client that wants to use the managed packet network (e.g., send and receive data, such as voice data) can register with the managed packet network. Registration can be used to authorize the use of the managed packet network and control the amount of packet traffic entering the managed packet network. The traffic in the network can be Session Initiation Protocol (SIP) traffic, which is used to establish multimedia sessions.

Currently, SIP clients send their registration requests to a border element either by using the directly provisioned border element address or by using a Domain Name System (DNS) look-up of the border element's provisioned Fully Qualified Domain Name (FQDN) and using DNS round robin to choose a border element. This solution does not provide adequate balancing of traffic across border elements.

Most currently available SIP border elements are not aware of the traffic coming through other border elements serving the same network. DNS servers are also unaware of the current registered clients on any given border element or the utilization of those border elements by authorized or unauthorized packet traffic. This results in the arrival of new traffic towards border elements which are overloaded, while other border elements in the same managed packet network are under-utilized.

Currently, proxy devices do not keep track of valid, non-expired registrations and require processing all requests by clients to refresh registration with the network. Such an approach is time consuming, inefficient, and is not scalable to large networks handling large numbers of clients and traffic. Furthermore, such an approach requires that the SIP proxy device handle all registrations for all geographic locations to enable reverting between different border element processors in the event that a border element processor fails. Therefore, this solution is not scalable to a large network handling a large number of clients and large amount of traffic in the network.

SUMMARY OF THE INVENTION

Traffic (e.g., packets relating to real-time multimedia traffic) entering the managed packet network can be controlled by utilizing a network element (e.g., load balancing engine) that receives messages from border element processors indicative of registration requests from clients and distributes the registrations across the border element processors. The border element processors can act as registration proxies and also as gates for traffic passing through the network border (e.g., into and from the managed packet network). The load balancing engine network element can provide centralized, orderly control of real-time traffic (e.g., voice, video or multimedia data) entering the managed packet network by distributing registrations for clients (e.g., end users) across the border element processors. Control of real-time traffic entry (e.g., SIP traffic) is accomplished by fair distribution of registrations among a group of border element processors (e.g., a border element group). In one aspect, the invention allows administrative control to be performed by utilizing border element processors to control the distribution of traffic passing through the network border element processors.

In one aspect, the invention features a method for control of traffic entry of a managed packet network. The method includes the step of receiving, from a border element processor, a first message indicative of a new active registration request associated with a client. The border element processor is one of a plurality of border element processors controlling data packets entering the managed packet network. The method also includes load balancing (e.g., by a load balancing engine) the new active registration request across the plurality of border element processors and assigning the client to a designated border element processor. The method also includes the step of generating a second message in response to the new activation registration request, the second message including a parameter identifying the designated border element processor assigned to the client.

In some embodiments, the second message includes a second parameter identifying that the client has been load balanced.

The load balancing engine can be a standalone entity (e.g., a separate and/or a distinct device from the border element processors). In some embodiments, the load balancing engine coexists within the border element processors (e.g., the functionality of the load balancing engine is run on the border element processors).

In some embodiments, the border element processors reside in a geographical location or reside in different geographical locations.

The new active registration request can be load balanced across the plurality of border element processors based on at least one of: a number of active registrations on each border element processor, a capacity of each border element processor, a client usage pattern, a client class of service or an operator preference. In some embodiments, the step of load balancing includes assigning one or more of the plurality of border element processors to the client.

In some embodiments, a report including a number of active registrations being handled by each of the plurality of border element processors, traffic load levels of each of the plurality of border element processors and/or available capacity for each of the plurality of border element processors is received by the load balancing engine. A new active registration request can be associated with one or more clients.

In some embodiments, the method includes receiving a third message reflecting a register refresh request from the client and reassigning a client from the designated border element processor to a second designated border element processor. The method can also include transmitting, by a load balancing engine, a fourth message to the designated border element processor to migrate the client to the second designated border element processor.

The method can also include performing, by a load balancing engine, network initiated load balancing on at least one client corresponding to at least one active registration. In some embodiments, the method includes assigning the at least one client to a newly designated border element processor. The method can also include transmitting, by a designated border element processor, a third message to redirect the at least one client to the newly designated border element processor after the refresh registration request is sent by the client.

In some embodiments, healthchecking is performed on the plurality of border element processors to determine if any one of the plurality of border element processors has failed or recovered. At least one of the plurality of border element processors can transmit a third message reflecting that the at least one of the plurality of border elements processors are responsive and can handle calls for the managed packet network. This message can be received by the load balancing engine from the border element processors. At least one of the plurality of border element processors can transmit a third message (received by the load balancing engine) reflecting at least one of calls being handled and resource usage levels. A third message can be transmitted to the plurality of border element processors requesting a response that provides information corresponding to at least one of calls being handled and resource usage levels of the plurality of border element processors.

In some embodiments, it is determined that a previously failed border element processor has recovered and at least one of the plurality of border element processors is informed to migrate at least one active registration to the recovered border element processor. The step of informing can include transmitting a third message to migrate at least one active registration, the third message including an identifier (e.g., identifier corresponding to the client(s) associated with the active registrations to be migrated). The identifier can include at least one of an area code, a directory number, a Session Initiation Protocol uniform resource identifier (SIP URI) or TEL uniform resource identifier (TEL URI).

In another aspect, the invention features a method for control of traffic entry of a managed packet network. The method includes receiving, at a border element processor, an active registration request associated with a client. The border element processor is one of a plurality of border element processors controlling data packets entering the managed packet network. The method also includes transmitting a message indicative of the active registration request to a load balancing engine to load balance the active registration request across the plurality of border element processors.

In some embodiments, a border element processor determines whether the active registration request associated with the client is a new active registration request or whether the active registration request includes a parameter identifying that the client has been previously load balanced by the load balancing engine. The border element processor can transmit, to the load balancing engine, the message indicative of the active registration request if the active registration request is the new active registration request and does not include the parameter.

In some embodiments, a border element processor receives (e.g., from the load balancing engine) a second message in response to the active registration request identifying a designated border element processor assigned to the client. The border element processor can inform the client of the designated border element processor.

Each of the plurality of border element processors can transmit a second message to the load balancing engine identifying a number of active registrations being handled by each of the plurality of border element processors.

In yet another aspect, the invention features a computer program product, tangibly embodied in a computer readable storage medium for control of traffic entry of a managed packet network. The computer program product includes instructions operable to cause a data processing apparatus to receive, from a border element processor, a first message indicative of a new active registration request associated with a client. The border element processor is one of a plurality of border element processors controlling data packets entering the managed packet network. The new active registration request is load balanced across the plurality of border element processors and the client is assigned to a designated border element processor. A second message is generated in response to the new activation registration request, the second message including a parameter identifying the designated border element processor assigned to the client.

In some embodiments, the second message also includes a second parameter identifying that the client has been load balanced.

In another aspect, the invention features a computer program product, tangibly embodied in a computer readable storage medium for control of traffic entry of a managed packet network. The computer program product includes instructions operable to cause a data processing apparatus to receive an active registration request associated with a client and transmit a message indicative of the active registration request to a load balancing engine to load balance the active registration request across a plurality of border element processors controlling data packets entering the managed packet network.

In some embodiments, the computer program product further includes instructions operable to cause a data processing apparatus to determine whether the active registration request associated with the client is a new active registration request or whether the client has been previously load balanced by the load balancing engine. The message indicative of the active registration request is transmitted to the load balancing engine if the active registration request is the new active registration request.

In yet another aspect, the invention features a managed packet network system including a plurality of border element processors for controlling data packets entering the managed packet network. Each border element processor is configured to receive an active registration request associated with a client and transmit a first message indicative of the active registration request. The system also includes a load balancing engine configured to receive the first message indicative of a new active registration request associated with the client and load balance the new active registration request across the plurality of border element processors. The load balancing engine is also configured to assign the client to a designated border element processor and generate a second message in response to the new activation registration request. The term "configured to" can include a device that is preconfigured to perform specific functionalities (e.g., functionalities of the border element processor or the load balancing engine) or it can include a device that implements instructions from a computer program product (e.g., software) embodied in a computer readable storage medium to perform the requisite functionalities. The second message includes a parameter identifying the designated border element processor assigned to the client.

In some embodiments, the load balancing engine and the border element processor coexist on a network device (e.g., the functionalities of the load balancing engine and the border element processor are executed by the same device). In some embodiments, the load balancing engine is centralized and the load balancing engine and the plurality of border element processors exist on different respective network devices. The load balancing engine and the border element processors can exist in the same geographical location or can exist in different geographical locations.

The invention, in one aspect, features a managed packet network system that includes means for receiving, from a border element processor means, a first message indicative of a new active registration request associated with a client means. The border element processor means is one of a plurality of border element processor means controlling data packets entering the managed packet network. The system also includes means for load balancing the new active registration request across the plurality of border element processor means and means for assigning the client means to a designated border element processor means. The system also includes means for generating a second message in response to the new activation registration request, the second message including a parameter identifying the designated border element processor means assigned to the client means.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

A managed packet network can be a private network or a secured network with border element processors that control the traffic (e.g., packet traffic) coming into the network. Examples of managed packet networks include, for example, a carrier multiprotocol label switching (MPLS) network, an enterprise network or a network with a firewall border where packets passing through the firewall (e.g., coming into the network or going out of the network) are monitored. Operators allow known qualified real time traffic to enter the managed packet network through network border element processors. Border element processors act as gates for packets passing into and out of the managed packet network. The traffic in the network can be packets associated with Session Initiation Protocol (SIP) and its related media.

Figure 1:
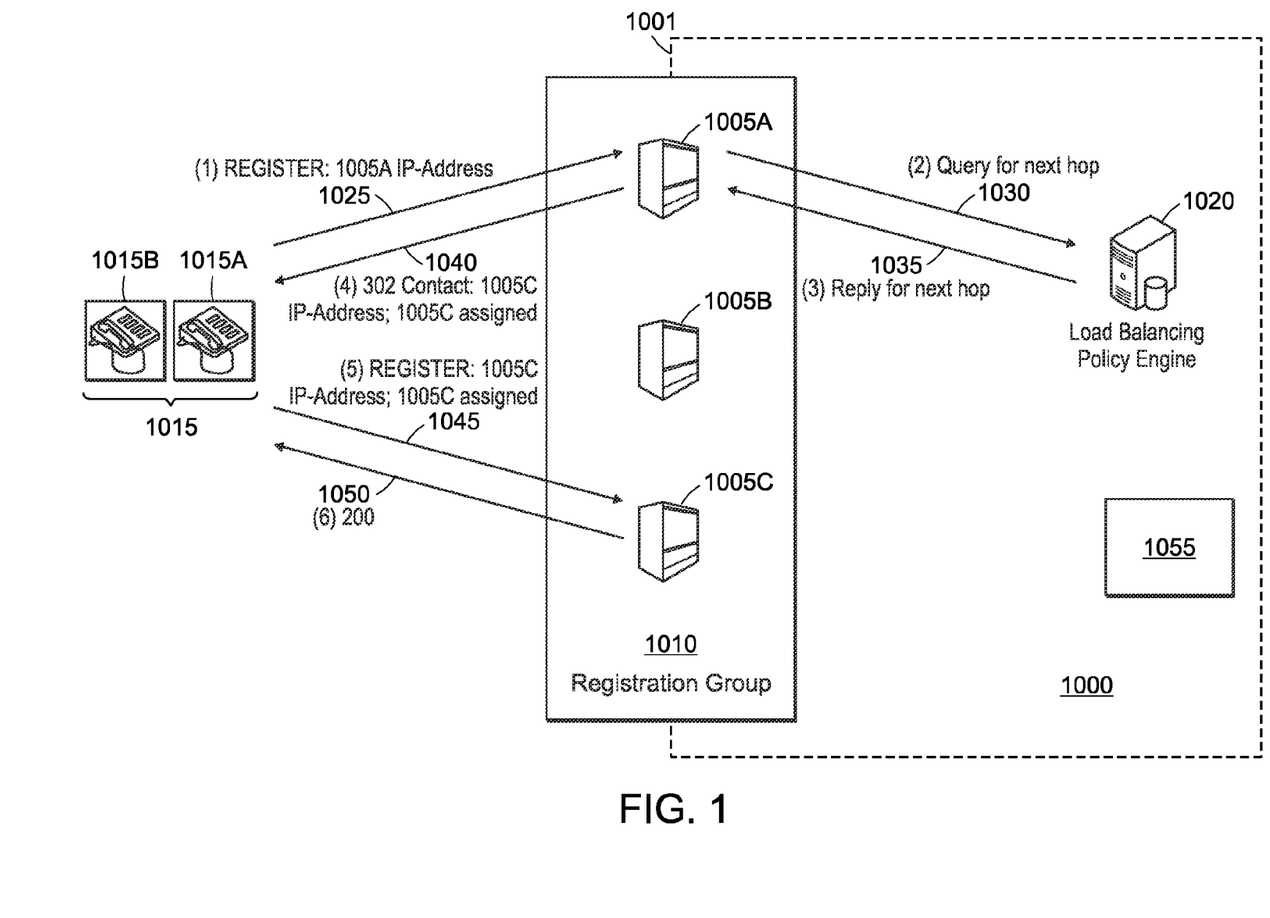
FIG. 1 shows border element processors at an edge of a managed packet network, an associated load balancing engine in the managed network, and a client registering with the managed network, according to an illustrative embodiment of the invention.

FIG. 1 shows border element processors at an edge of a managed packet network, an associated load balancing engine (e.g., load balancing policy engine) in the managed network, and a client registering with the managed network, according to an illustrative embodiment of the invention. The managed packet network 1000 (e.g., a secured network) includes a plurality of border element processors 1005A, 1005B, 1005C (e.g., two or more border element processors) at an edge of the managed packet network. Border element processors 1005A, 1005B, 1005C control traffic/data packets (e.g., relating to real-time multimedia traffic, such as voice data) entering the managed packet network 1000 at the network border 1001. The border element processors 1005A, 1005B, 1005C belong to a border element group 1010 (e.g., a registration group) that handles traffic and registrations for one or more clients 1015. The managed packet network also includes a load balancing engine 1020 (e.g., a load balancing policy engine), which is a network element that monitors the number of active registrations being handled by the border element processors 1005A, 1005B, 1005C. A client 1015 can be an endpoint or an end user of the managed packet network 1000 (e.g., a telephone or other device). A client 1015 can include one line. In this embodiment, the client includes two lines 1015A and 1015B. The client 1015 sends a registration request to border element processor 1005A to register with the managed packet network 1000. The load balancing engine 1020 load balances the client 1015 registration across the border element processors 1005A, 1005B, 1005C and, in this instance, assigns the client 1015 to a designated border element processor 1005C. Load balancing engine 1020 is a centralized entity that load balances client registration requests across the border element processors 1005A, 1005B, 1005C. Specifically, the load balancing engine 1020 assigns the client 1015 to a border element processor 1005C that is least loaded so as to evenly distribute traffic (e.g., packets) passing through the border element processors 1005A, 1005B and 1005C. In this embodiment, the load balancing engine 1020 is a stand-alone entity (e.g., comprised of one or more devices that are distinct from the border element processors 1005A, 1005B, and 1005C). When a client 1015 contacts a border element processor 1005A to register, the load balancing engine 1020 receives a message from the border element processor 1005A indicative of a new registration request. The load balancing engine 1020, however, can redirect new registrations to another border element processor 1005C that is least loaded (e.g., handling the least number of clients, calls, traffic, etc.) to distribute (e.g., evenly distribute) registrations from the client 1015 across border element processors 1005A, 1005B and 1005C.

Load balancing is a technique to distribute load (e.g., data or traffic) evenly across two or more border element processors 1005A, 1005B and 1005C to achieve optimal resource utilization, maximize throughput, minimize response time, and avoid overload of the border element processors 1005A, 1005B and 1005C. Using multiple border element processors 1005A, 1005B and 1005C with a load balancing logic, instead of a single border element processor, can increase reliability through redundancy. The load balancing service is provided by a load balancing engine 1020 (e.g., a network device such as a Sonus PSX™ designed by Sonus Networks, Inc.).

A border element processor 1005A, 1005B or 1005C (e.g., border element group member or a registration group element) can be a network element/device residing at the border 1001 (e.g. Sonus Network Border Switch™ by Sonus Networks, Inc.). Border element processors 1005A, 1005B or 1005C monitor packets of data (e.g., packets relating to real-time multimedia traffic, such as voice data) passing through the network border 1001 coming to and from the secured network 1000. Border element processors 1005A, 1005B, 1005C act as registration proxies for a client 1015 and can keep the state/status of the registrations being handled (e.g., whether a registration has expired or is active). Border element processors 1005A, 1005B, 1005C can be used to orderly control the traffic (e.g., packets relating to real-time multimedia traffic, such as voice data) entering the managed packet network 1000 by controlling distribution of registration information on the border element processors 1005A, 1005B, 1005C. In some embodiments, each border element processor 1005A, 1005B or 1005C handles about an equal number of session setup/teardown related messages as the number of registrations hosted by the border element processor (e.g., on the order of thousands).

Border element processors 1005A, 1005B, 1005C can belong to border element groups. In this embodiment, the border element processors 1005A, 1005B, 1005C belong to the same border element group 1010. In some embodiments, the border element processors 1005A, 1005B, 1005C can be grouped according to the geographical locations in which the border element processors reside. Border element group 1010 can monitor traffic (e.g., packets relating to real-time multimedia traffic) from clients 1015 in a given geographical location (e.g., the border element processors 1005A, 1005B, 1005C residing in the same geographical location as the client 1015). The border element processors 1005A, 1005B, 1005C can keep track of the number of active registrations being handled. Each border element processor 1005A, 1005B or 1005C reports the number of active registrations to, for example, the load balancing engine 1020. Clients 1015 (e.g., endpoints or end users) already registered with the managed network 1000 send refresh registrations to its designated border element processor (1005C assigned to the client 1015). This is due to SIP protocol semantics, as refresh registration requests are sent to the same/designated border element processor (e.g., the border element processor to which the initial successful registration request is sent by the client). Registrations are active for as long as the duration specified in the registration request sent by the client 1015. The duration can be specified in the "expires" header of the request. The duration can be extended with each successful refresh registration request sent by the client 1015 to its designated border element processor 1005C.

When a client 1015 powers on (e.g., turns on), it sends a registration request 1025 (REGISTER request) to one of the border element processors (e.g., 1005A) in the border element group 1010. This border element processor 1005A receives the registration request from the client and forwards the request to a load balancing engine. The border element processor 1005A determines if the registration request 1025 from the client 1015 is a new active registration request. If a client 1015 has been previously load balanced, the registration request 1025 includes a parameter indicating that load balancing has already been performed. In some embodiments, the border element processor 1005A informs the load balancing engine 1020 of the registration request if the registration request 1025 is new (e.g., if the registration request 1025 does not include this parameter indicating that the client was previously load balanced).

If the registration request 1025 is new, the border element processor 1005A transmits a message 1030 (e.g., query), reflecting a new active registration request 1025 from the client 1015, to the load balancing engine 1020. The load balancing engine 1020 load balances the registration request 1025 across the border element processors 1005A, 1005B, 1005C in the border element group 1010 based on the latest information it has for active registrations in each border element processor 1005A, 1005B and 1005C. The load balancing engine 1020 assigns a designated border element processor 1005C to take care of this client 1015 (e.g., the border element processor dedicated to handling packets of multimedia traffic from this client). The load balancing engine 1020 sends a message 1035 (e.g., a 302 response) in response to the border element processor 1005A that relayed the registration request 1030. The message 1035 includes the identity of the designated border element processor 1005C assigned/selected by the load balancing engine 1020. The load balancing engine 1020 can insert a parameter in the response message 1035 including an identifier/data corresponding to the designated border element processor 1005C (e.g., IP address). The load balancing engine 1020 can also insert a parameter into the message 1035 indicating that load balancing (e.g., load distribution) for this registration request 1025 has been performed. In one embodiment, the message 1035 includes a parameter indicating that the request 1025 has already been load balanced or load distributed among the border element processors 1005A, 1005B, and 1005C.

Based on the information (e.g., message 1035) received by the load balancing engine, the border element processor 1005A transmits a message 1040 to the client 1015 in response to the client's request 1025. The message 1040 identifies the designated border element processor 1005C assigned to the client 1015 and can direct the client 1015 to contact the designated border element processor 1005C. The message 1040 can include identity information/data (e.g., an IP address) for the designated border element processor 1005C and the parameter indicating that the client 1015 has been load balanced by the load balancing engine 1020. The client 1015 contacts its designated border element processor 1005C by sending a register request 1045 together with the parameter indicating that the client 1015 has been load balanced. When the designated border element processor 1005C receives the registration request 1045 from the client 1015, it does not contact the load balancing engine 1020 because the parameter in the request specifies that the client 1015 has already been registered with the network 1000 and load balanced. In some embodiments, the designated border element processor 1005C sends a message 1050 in response to the client's register request 1045 acknowledging that it has been assigned to the client 1015 and that it can handle traffic (e.g., packet relating to real-time multimedia traffic) for the client 1015.

In this embodiment, a client 1015 corresponds to one or more call lines 1015A and 1015B (e.g., IP-PBXs/PBXs that do not register for each call line separately). The load balancing engine 1020 can include or utilize mapping from a table (e.g., Address of Records) that specifies the number of lines controlled by IP-PBXs/PBX clients. If a load balancing engine 1020 receives a message from a border element processor 1030 reflecting a new registration request for a client 1015 (e.g., IP-BPX or IAD controlling more than one line), the load balancing engine 1020 assigns a designated border element processor 1005C to the client 1015. The load balancing engine 1020 also sends a message 1035 to the border element processor 1005A that informed the load balancing engine 1020 of the registration request 1025. The message 1035 includes information identifying the designated border element processor 1005C and informing of the number of lines associated with this registration. The border element processor 1005A inserts a parameter into the response 1040 that reflects the number of lines 1015A and 1015B associated with the client 1015 to be registered. The border element processor 1005A sends the response 1040 to the client 1015. Once the client 1015 is notified of the designated border element processor 1005C, it sends a registration request 1045 (REGISTER request) to the designated border element processor 1005C. This registration request 1045 can include a parameter indicating that the client 1015 has been loadbalanced but also includes a parameter identifying the number of lines 1015A and 1015B associated with the client 1015. When the designated border element processor 1005C finds the parameter identifying the number of lines 1015A and 1015B in a request and when the registration process completes successfully, it increments the number of active registrations it hosts by the number of lines rather than one. Because a client 1015 with multiple call lines 1015A and 1015B can register with the network even though they do not register for each line 1015A or 1015B individually, load balancing session traffic is performed even in the presence of IP-PBX/PBXs. The information about number of lines corresponding for an IP-PBX AoR (e.g., an Address of Record that is a SIP identifier for a particular user, device or equipment) can be provisioned in the load balancing engine 1020 controlling different geographic sites. In some embodiments, a central database 1055, which is accessed by different load balancing engines 1020, is utilized or IP-PBX AoR is not be treated specially by load balancing engine 1020.

Figure 2:
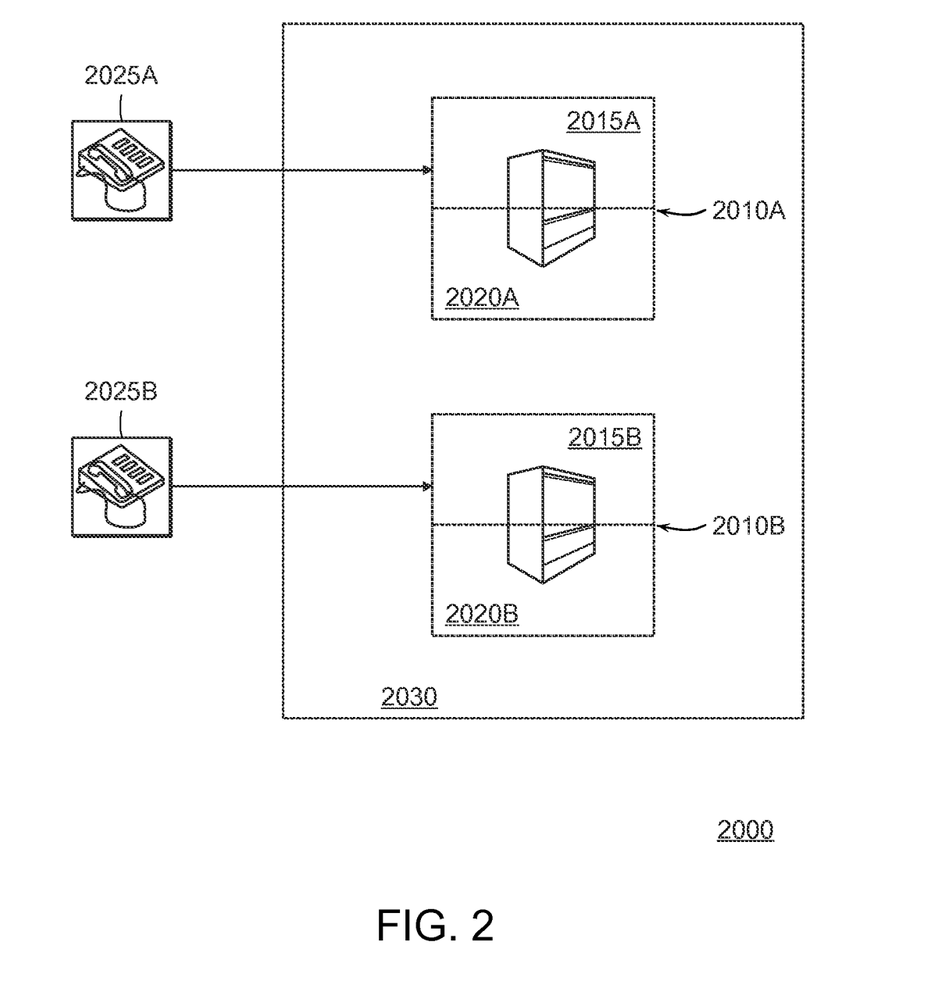
FIG. 2 shows border element processor modules at an edge of a managed packet network, associated load balancing engine modules of the managed packet network, and clients registering with the managed packet network, according to another illustrative embodiment of the invention.

FIG. 2 shows border element processor modules at an edge of a managed packet network, associated load balancing engine modules of the network, and clients registering with the managed network, according to another illustrative embodiment of the invention. The managed packet network system 2000 includes network devices 2010A and 2010B at an edge of the managed packet network. Each network device 2010A and 2010B can include the functionalities of a border element processor and load balancing engine (e.g., border element processor 1005A, 1005B or 1005C and load balancing engine 1020) as described above in FIG. 1). One border element processor 1005A, 1005B or 1005C, a subset of the border element processors (e.g., 1005A, 1005B and/or 1005C) or all of the border element processors 1005A, 1005B and 1005C can include the functionalities of a load balancing engine. In this embodiment, the load balancing engine coexists with the border element processor in a common processor structure. Network Device 2010A includes a module 2015A that operates as a border element processor and another module 2020A that operates as a load balancing engine. Network Device 2010B includes a module 2015B that operates as a border element processor and another module 2020B that operating as a load balancing engine. Clients 2025A and 2025B can register with the managed packet network by sending registration requests to border element processor modules 2010A and 2010B. The border element processor modules 2015A and 2015B in the network devices 2010A and 2010B function as registration proxies for the clients 2025A and 2025B and perform the same functionalities as the border element processors described above for FIG. 1. The load balancing engine modules 2020A and 2020B can load balance registration requests from clients 2025A and 2025B and can perform the same functionalities as the load balancing engine (e.g., load balancing logic) as described above in FIG. 1. In this embodiment, the network devices 2010A and 2010B belong to a border element group 2030 that can correspond to, for example, the geographical location(s) of the network devices 2010A and 2010B. In other embodiments, the devices can belong to different border element groups (e.g., network device 2010A can belong to a first border element group and network device 2010B can belong to a second, different border element group).

Figure 3A:
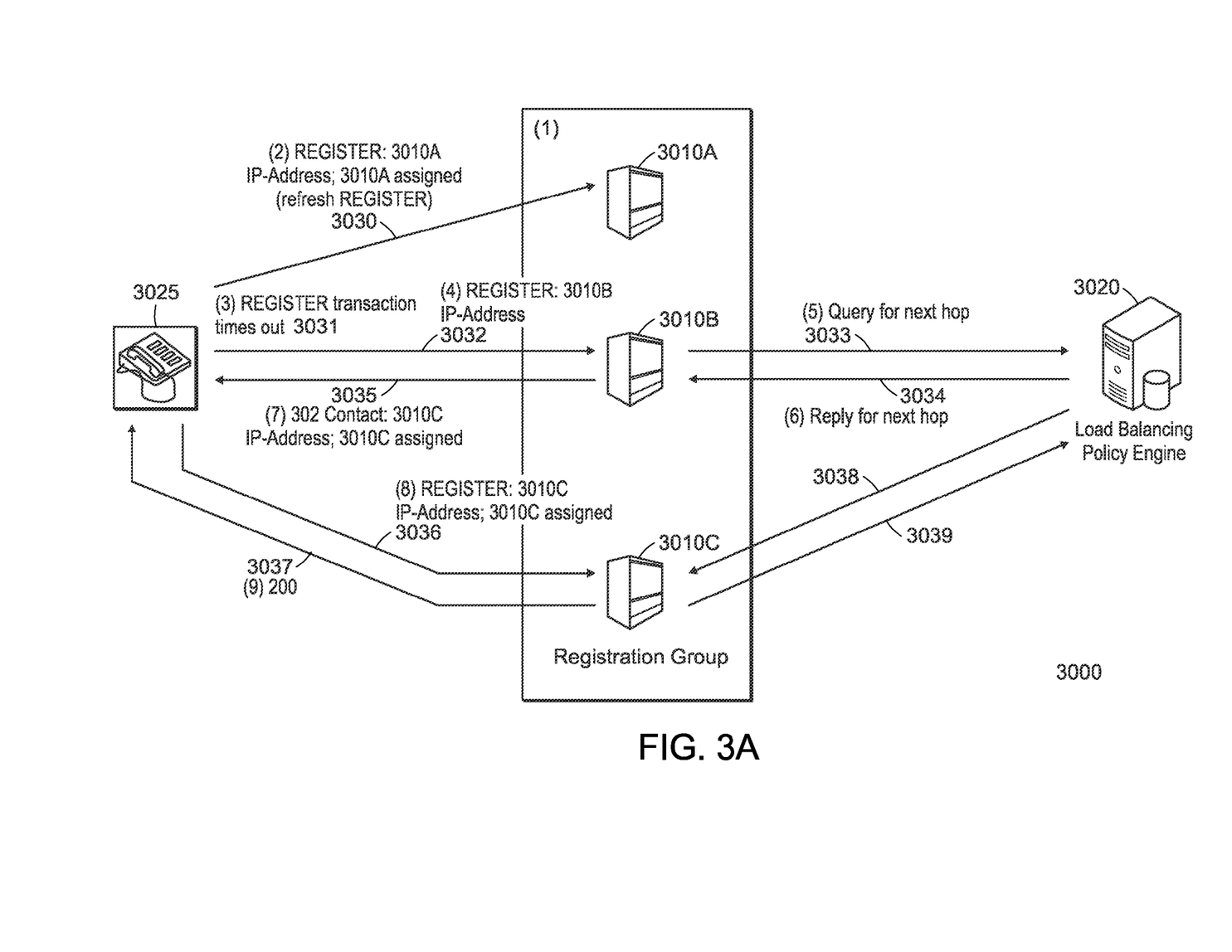
FIG. 3A shows border element processors at an edge of a managed packet network, a failure of a border element processor and registration of a client after failure of the border element processor, according to an illustrative embodiment of the invention.

FIG. 3A shows failure of a border element processor at an edge of a managed packet network and registration of a client (previously load balanced to the failed border element processor) through another border element processor, according to yet another illustrative embodiment of the invention. The managed packet network 3000 includes border element processors 3010A, 3010B, and 3010C at an edge of the network 3000 and a load balancing engine 3020 that services client 3025, with the same functionalities as the load balancing engine and the border element processors as described above for FIGS. 1-2. The load balancing engine 3020 can also perform healthchecking on one or more border element processors 3010A, 3010B, and 3010C to determine if any one of the border element processors 3010A, 3010B or 3010C have failed or recovered from a failure. A border element processor 3010A, 3010B or 3010C can be deemed to have "failed" if it is unable to handle packet traffic (e.g., packets related to real-time multimedia traffic). In the event of a failure of a border element processor 3010A, the client can re-register with the managed network 3000 via another border element processor 3010B. By registering again with the managed network, the client 3025 will be assigned a new border element processor 3010C.

If a border element processor 3010A, 3010B or 3010C fails, a client 3025 sending a request to refresh its registration to its designated border element processor will not successfully refresh its registration because there will be no reply from the failed border element processor. In this embodiment, the client 3025 already registered with the network 3000 is assigned to designated border element processor 3010A, which has failed. The client sends a message 3030 to its designated border element processor 3010A to refresh its registration (e.g., indicating that it is here and ready for service with the managed network 3000, for example, to receive/transmit calls). In this embodiment, there will be no reply from failed border element processor 3010A and the refresh registration request will time out 3031. Therefore, the client 3025 can send a new registration request 3032 to another border element processor 3010B in the group and that registration request will be loadbalanced.

The process for load balancing the client 3025 after a failure of its designated border element processor 3010A is the same as load balancing the client after a new registration request (as described above for FIG. 1). For example, the border element processor 3010B sends a message 3033 to the load balancing engine 3020 reflecting the registration request 3032 from the client 3025 after failure of its assigned border element processor 3010A. The load balancing engine 3020 load balances the request across the border element processors 3010B and 3010C and assigns the client 3025 to a newly assigned border element processor 3010C acting as a standby/backup border element processor for the failed border element processor 3010A. The load balancing engine 3020 sends a reply 3034 to the border element processor 3010B identifying the newly assigned border element processor 3010C. The reply message 3034 can include identifier information (e.g., IP address) of the backup border element processor 3010C so that the client can contact the backup border element processor to begin sending/receiving data from the network 3000. Upon receiving the reply message 3023 from the load balancing engine 3020, the border element processor 3010B transmits a message 3035 to the client 3025 identifying the newly assigned border element processor 3010C. As noted in FIG. 1, the message 3035 can include a parameter indicating that the client 3025 has been load balanced and assigned to a border element processor 3010C. The client 3025 then sends a registration request 3036 to its newly assigned border element processor 3010C. Because the registration request 3036 includes a parameter identifying that the client 3025 has been load balanced, the newly assigned border element processor 3010C (acting as the backup border element processor) does not forward this request to the load balancing engine 3020. Instead the border element processor 3010C sends a reply 3037 confirming that the client 3025 has been registered and that it can handle packet traffic (e.g., packets relating to real-time multimedia traffic) for the client 3025.

A load balancing engine 3020 can perform healthchecking to determine if a failed border element processor (e.g., border element processor 3010A) has recovered. The process for migrating registrations after recovery of a failed border element processor is further discussed below in FIG. 3B. Healthchecking can be performed based on, for example, reports 3039 sent by the border element processors 3010A, 3010B or 3010C that can include information on the number of calls being handled by the border element processor, number of active registrations being handled by the border element processor, traffic load levels of each border element processor, available capacity of each border element processor, and/or information relating to resource usage levels of the border element processor (e.g., CPU levels, etc.). For purposes of clarity, FIG. 3A shows border element processor 3010C sending a healthchecking report to the load balancing engine 3020; however, all of the border element processors 3010A, 3010B, 3010C are configured to send reports to the load balancing engine 3020. Border element processors 3010A, 3010B or 3010C can report the number of active registrations being handled, number of calls being handled and/or its resource usage levels by adding such information to a standard protocol (e.g., SIP or Diameter) or by using a proprietary protocol.

The load balancing engine 3020 can also perform healthchecking by transmitting a message 3038 to one or more border element processors 3010A requesting a response 3039 from the border element processor 3010A. The border element processor(s) 3010A can respond with a message 3039 indicating that the border element processor(s) 3010A is responsive and ready to handle calls/traffic in the network 3000. In some embodiments, a request/message 3038 can be transmitted to one or more border element processors 3010A requesting a response 3039 that includes specific information (e.g., the number of active registrations being handled by the border element processor 3010C, the number of calls being handled by the border element processor 3010C and resource usage levels).

Figure 3B:
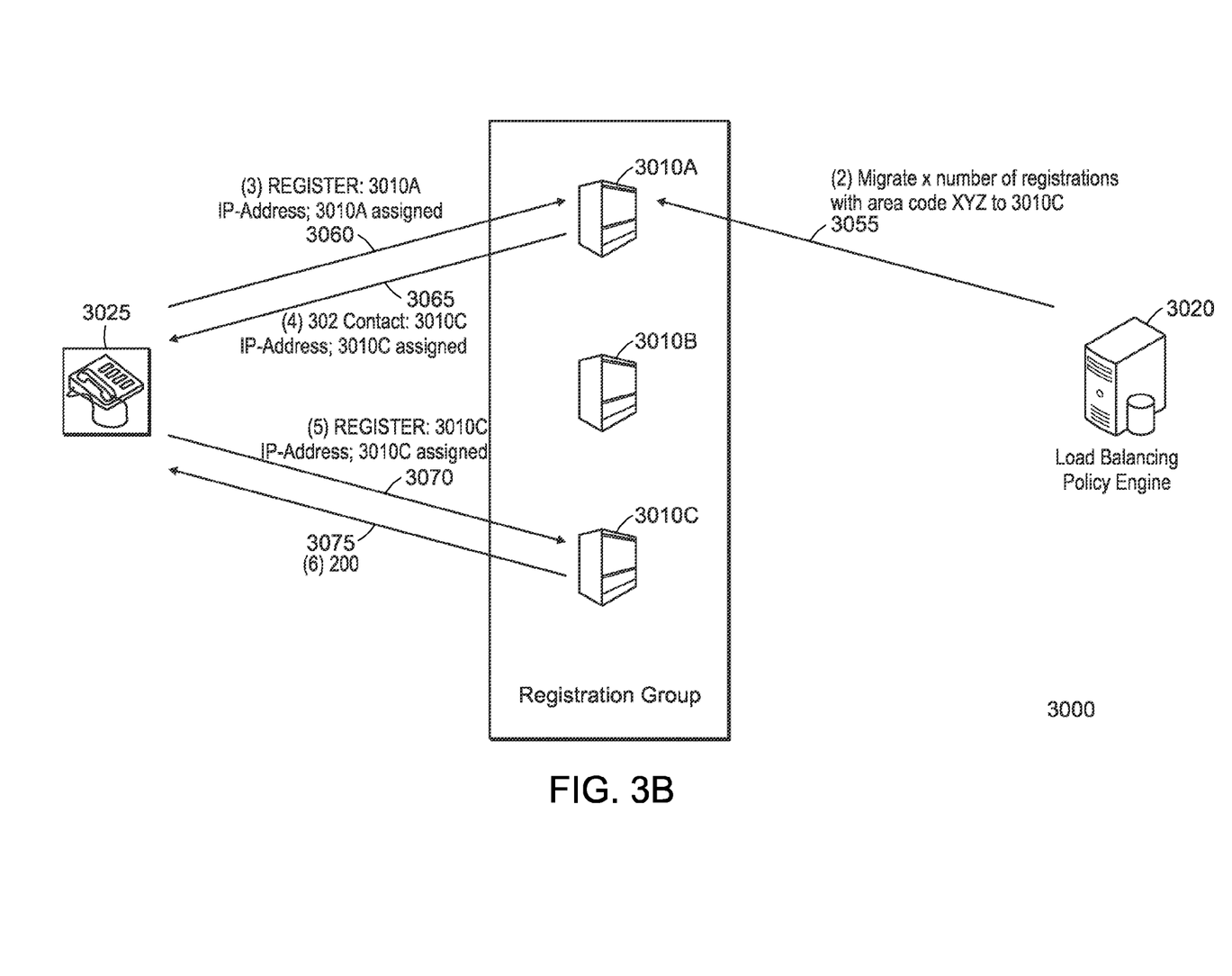
FIG. 3B shows border element processors at the edge of a managed packet network and a client reverting to a recovered border element processor, according to yet another illustrative embodiment of the invention.

FIG. 3A above describes the process for reassigning a client 3025 after failure of its designated border element processor. FIG. 3B shows the process after recovery of a previously failed designated border element processor, according to an illustrative embodiment. Specifically, FIG. 3B shows a migration of registrations from a backup border element processor to a recovered border element processor. Client 3025 registrations (e.g., registrations for clients 3025 that have already registered with the managed packet network) are reverted after recovery of one or more failed border processor element(s) 3010C or recovery of a failed site (e.g., a geographical location where border element processors reside). In this embodiment, border element processor 3010A has been assigned as a backup border element processor for client 3025 and border element processor 3010C has recovered from a failure. As noted above, load balancing engine 3020 can perform healthchecking on the border element processors 3010A, 3010B, and 3010C. If the load balancing engine 3020 determines during healthchecking (e.g., using the healthchecking logic as described above in FIG. 3A) that a previously failed border element processor 3010C has recovered, some registrations being handled by other border element processors (e.g., backup border element processor 3010A) can be migrated to the recovered border element processor 3010C. In this embodiment, client 3025 registrations are reverted from a backup border element processor 3010A to a recovered border element processor 3010C. If the load balancing engine 3020 detects that the previously failed border element processor 3010C has recovered, the load balancing engine 3020 instructs the backup border element processor 3010A to migrate the registrations and revert back to the recovered border element processor 3010C.

Healthchecking allows the load balancing engine 3020 to detect when any one of border element processors 3010A, 3010B or 3010C have failed and detect when a previously failed border element processor 3010C as having recovered. If the load balancing engine 3020 detects that a previously failed border element processor 3010C has recovered, the load balancing engine 3020 sends a message 3055 to the backup border element processor 3010A instructing the backup border element processor 3010A to migrate registrations for the client 3025 back to the recovered border element processor 3010C. The message 3055 identifies the registrations to be migrated by including an identifier (e.g., such as providing actual numbers for endpoints, an area code, a directory number, a Session Initiation Protocol uniform resource identifier (SIP URI), TEL uniform resource identifier (TEL URI), or any combination thereof). The client can periodically message its border element processor 3010A with a registration refresh request 3060 notifying the border element processor 3010A that it is here and ready to handle traffic from network 3000 (e.g., notifying the border element processor that the client is ready to make and receive calls). In this instance, because the backup border element processor 3010A received a message 3055 instructing it to migrate registrations back to border element processor 3010C, the backup border element processor 3010A sends a response message 3065 to the client 3025 notifying that the client 3025 should revert back to the recovered border element processor 3010C. For example, the backup border element processor 3010A can send a message 3065 instructing the client 3025 to contact the recovered border element processor 3010C and including an identifier such as an IP address of the recovered border element processor 3010C. In some embodiments, a backup border element processor 3010A terminates the registration of the client 3025 (e.g., with a NOTIFY request) if client 3025 has registered for a package that entitles the client 3025 to receive asynchronous/unsolicited notifications from the network (e.g., registration event package). After receiving message 3065, the client contacts the recovered border element processor 3010C by sending a registration 3070 indicating that the client 3025 is available to make/receive calls (e.g., by sending a refresh registration request to the recovered border element processor 3010C). Since load balancing engine 3020 already load balanced this client by designating/assigning the border element processor 3010C for the client 3025, the recovered border element processor 3010C does not forward this request to the load balancing engine 3020 and instead sends a response 3075 acknowledging that can handle traffic for the client 3025.

In some embodiments, the network can initiate load balancing. The load balancing engine 3020 can notify the border element processor 3010A to migrate the client 3025 to another border element processor (e.g., 3010B or 3010C) other than the border element processor 3010A which was originally assigned to the client 3025 for reasons such as, e.g., taking a border element processor 3010A out of service, rebalancing the load across the border element processors 3010A-3010C because of an upgrade on the border element processor 3010A.

Figure 4:
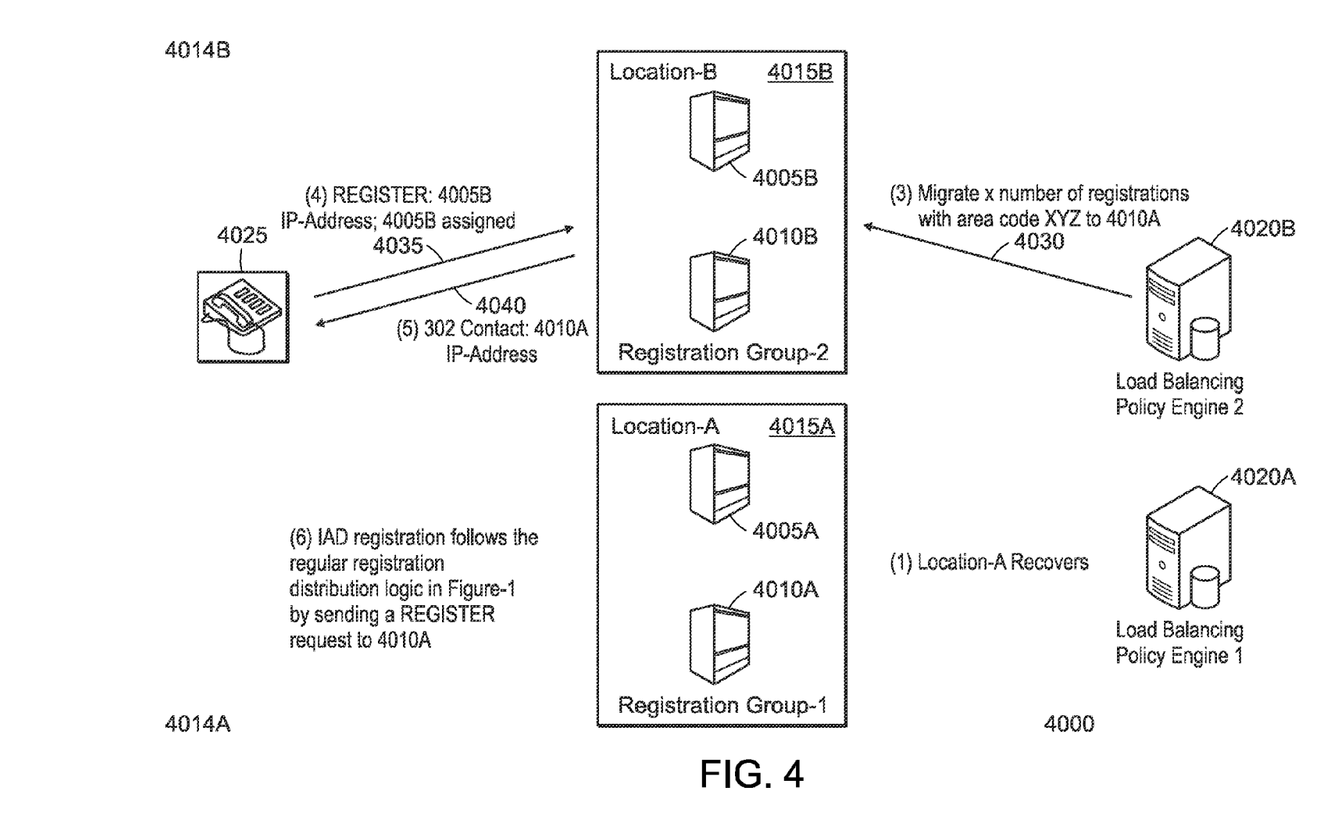
FIG. 4 shows border element processors in different geographical locations at an edge of a managed packet network, recovery of a geographical site from a failure and migration of a client to a border element processor in its recovered geographical site, according to an illustrative embodiment of the invention.

FIG. 4 shows border element processors at an edge of a managed packet network residing in different geographical locations, according to an illustrative embodiment. FIG. 4 also shows a client migrated back to a border element processor after recovery of a geographical site, according to an illustrative embodiment of the invention. In this embodiment, border element processors 4005A, 4010A, 4005B and 4010B belong to border element groups 4015A and 4015B according to the geographical locations 4014A and 4014B in which they reside. Border element processors 4005A and 4010A reside in geographical location A and belong to border element group 4015A. Border element processors 4005B and 4010B reside in geographical location B and belong to border element group 4015B. In other embodiments, the border element processors can reside in one geographical location and are associated with that border element group (e.g., FIG. 1). In this embodiment, load balancing engines 4020A and 4020B are each dedicated for each border element group 4015A and 4015B. For example, a centralized load balancing engine 4020A resides in geographical location 4014A and manages registrations for border element processors 4005A and 4010A in border element group 4015A for geographical location 4014A. Another centralized load balancing engine 4020B resides in geographical location 4014B and manages registrations for border element processors 4005B and 4010B in a second border element group 4015B for geographical location 4014B. A single load balancing engine can also serve two different geographical locations as well. In this embodiment, a client 4025 residing in geographical location 4014A registers with the managed packet network using border element processors 4005A and 4010A as proxies (e.g., as described above in FIG. 1). The corresponding load balancing engine 4020A for border element group 4015A load balances and assigns the client 4025 to a designated border element processor 4005A or 4010A. The process of registering with the network 4000 follows the registration logic described above for FIG. 1. For example, client 4025 can send a registration request to a border element processor 4005A in its geographical location 4014A. The registration request can be forwarded to the load balancing engine 4020A that assigns the client 4025 to a designated border element processor 4010A in the border element group 4015A. The load balancing engine 4020A assigns the client 4025 to the border element processor 4010A that has the lightest load relative to the other border element processors in the border element group 4015B.

In some embodiments, a site can be defined by designating a border element group to a given geographical site/location. Registrations can be redistributed to a backup site in the event of a site failure (e.g., the backup site handles the registrations on behalf of the failed site). A site failure takes place, for example, when all members of the border element group associated with a site are unavailable, e.g., border processor elements 4005A and 4010A associated with a site 4015A in a registration group become unavailable (e.g., failure of network in a geographic area 4014A). In the event of a site failure, registrations being handled by the failed border element processors 4005A and 4010A are sent to backup border element processors 4005B and 4010B in that act as backup location/site (e.g., failure of border element processors in geographical location 4014A triggers migrations of registrations to border element processors in geographical location 4014B which can handle the calls for the clients in geographical location 4014A). The process for reassigning a client 4025 to a backup border element processor at a backup site 4015B follows the reassignment logic as described above in FIG. 3A. For example, in the event of a site failure of location 4015A, any refresh registration requests sent to border element processors 4005A and 4010A will fail and time out, causing reassignment of the client 4025 to a border element processors 4005B in backup site 4015B. The load balancing engine 4020A or 4020B can choose the backup border element group 4015B (e.g., and assigning clients to corresponding backup border element processors 4005B and 4010B) based on a preconfigured policy information or other information provided by an operator of the network 4000.

Once a load balancing engine 4020A determines that a site 4015A and its corresponding border element processors 4005A and 4010A have recovered, a load balancing engine 4020A or 4020B can notify the backup border element processor 4005B at the backup site 4015B that the registrations from the clients in the previously failed geographical location 4015A are to be reverted/migrated to the recovered border element processors 4005A and 4010A. The process for notifying clients that they are to be migrated to the recovered border element processors 4005A and 4010A in the recovered location/site 4015A follows the migration logic discussed above for FIG. 3B. For example, load balancing engine 4020A can perform healthchecking (e.g., as described above in FIG. 3A) and when a site 4015A recovery is detected, the load balancing engine 4020A can send a message 4030 to the backup, newly designated border element processor 4005B that its registrations are to be migrated to the recovered border element processor 4010A. The message 4030 can include an identifier for the registrations to be migrated (e.g., by providing the actual numbers to be migrated or by providing an area code or other identifier indicating that all numbers/clients in area code XYZ are to be reverted back to a recovered border element processor). When a registered client 4025 sends a refresh register request 4035 to its newly assigned backup border element processor 4005B indicating that it is ready for service with the network, the border element processor 4005B notifies the client 4025 by sending a message 4040 that instructs the client 4025 to contact the recovered border element processor 4010A identified in the message (e.g., with an IP address of the backup border element processor 4010A). As in FIG. 3B, the backup border element processor 4005B can send a message (e.g., a NOTIFY message) to the client 4025 instructing/redirecting the client to contact the recovered border element processors 4010A (e.g., by including an identifier such as an IP address of the recovered border element processors). The client 3025 can then send a refresh registration request to the recovered border element processor 4010A notifying that the client is ready for service (e.g., make and receive calls) with the network 4000.

Figure 5A:
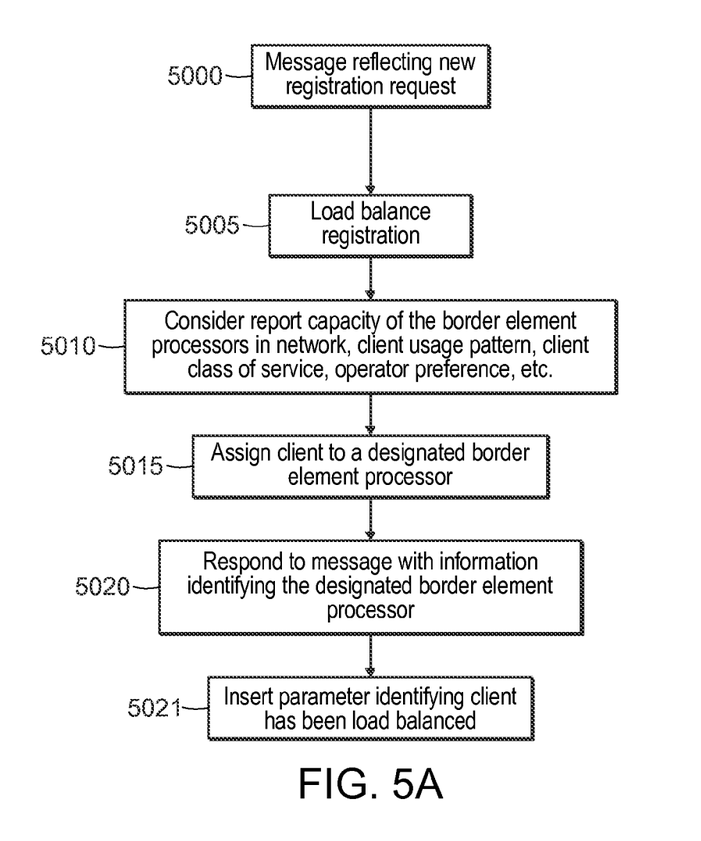
FIG. 5A shows a method for control of traffic entry in a managed packet network, according to an illustrative embodiment of the invention.
Figure 5B:
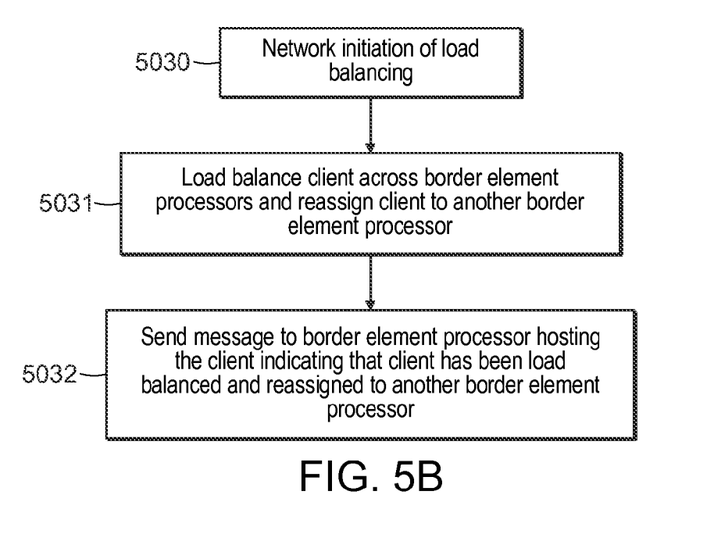
FIG. 5B shows another method for control of traffic entry in a managed packet network, according to an illustrative embodiment of the invention.

FIGS. 5A and 5B show methods for control of traffic entry in a managed packet network by a load balancing engine, according to illustrative embodiments of the invention. As shown in FIG. 5A, a load balancing engine receives a message from a border element processor reflecting a new active registration request that is associated with one or more client(s)

(Step 5000). The border element processor can be one of a plurality of border element processors, as shown in FIGS. 1-4. The load balancing engine (e.g., load balancing engine as shown in FIGS. 1-4) load balances the new active registration request across the border element processors (Steps 5005 and 5010) and assigns the client to one or more designated border element processor(s) (Step 5015). The method can also include collecting availability and resource usage levels of the border element processor (e.g., by using healthchecking techniques as described above in FIG. 3A) by the load balancing engine. Information relating to the availability and resource usage levels can be used to load balance the registration request. The border element processor then generates a message identifying the designated border element processor assigned to the client (Step 5020) and including a parameter indicating that the client has been load balanced (Step 5021).

The step of load balancing a new active registration request (Step 5005) can be performed based on at least one of a number of active registrations on each border element processor, a capacity of each border element processor, a client usage pattern, a client class of service or an operator preference (step 5010). A border element processor can perform a level of security monitoring or filtering (e.g., scanning for viruses, allowing voice but not video data through, etc.) on the packets relating to real-time multimedia traffic entering the managed packet network. The capacity of each border element processor can be an available bandwidth or other measurement that is a metric of the processing capability of a border element processor. Client usage patterns can correspond to, for example, different usage patterns by clients in different geographical locations (e.g., different usage patterns for different days of the year, different times during the day, different times of the week).

By way of example only, clients in geographical location A can have peak usage patterns from 9:00 AM-12:00 PM while clients in geographical location B can have peak usage patterns from 3:00 PM-5:00 PM. When load balancing a request across different border element processors, usage patterns can be considered. For example, one border element processor can report that it is handling more registrations for clients from geographical location A, rather than location B while a second border element processor can report that it is handling more registrations for clients from geographical location B, rather than location A. When load balancing a client from geographical location A, a load balancing engine can consider the usage patterns and assign the client to the second border element processor, so as to evenly distribute the traffic (e.g., packets relating to real-time multimedia traffic) being handled by the border element processors.

In some embodiments, different clients may be given different levels of quality of service, therefore, when load balancing a client class of service can be considered. Some clients may be given better service than others (e.g., quicker service, more bandwidth). Operator preference can be, for example, where an operator decides to limit the load/traffic being handled by a previously failed border element processor by giving the previously failed border element processor a light load (e.g., less traffic to be handled as compared to other border element processors in the network). An operator can, for example, limit the load being handled by a previously failed border element processor while debugging is performed on the previously failed border element processor. Operator preferences can be considered when load balancing a client registration request because the preferences can affect the available resources in the border element processors.

Network initiated load balancing can take place when a load balancing engine (e.g., 1020 in FIG. 1) can decide to load balance an already load balanced client again. As shown in FIG. 5B, in some embodiments, the network initiates load balancing, by the load balancing engine, on at least one client that corresponds to at least one active registration (e.g., a client already registered with the network) (Step 5030). Events that can trigger network initiated load balancing can include, for example, taking a network border element processor out of service, introducing a new border element processor or changing a capacity of a border element processor. The load balancing engine can load balance the client (Steps 5031), reassign the at least one client to a newly designated border element processor and transmit a message to redirect the at least one client to the newly designated border element processor (Step 5032). After load balancing the client (Step 5031), the load balancing engine can send a message (Step 5032) to the designated border element processor to migrate the client's registration to the second, newly designated border element processor. This message can include information identifying the second, newly designated border element processor (e.g., a message including data or a parameter corresponding to an identifier for the border element processor, such as, for example, an IP address). The message redirecting the client can also include information indicating which registrations are to be migrated such as an identifier (e.g., such as providing actual numbers for endpoints, an area code, a directory number, a Session Initiation Protocol uniform resource identifier (SIP URI), TEL uniform resource identifier (TEL URI), or any combination thereof). The method can include non-solicited redistribution of active registration(s) across the plurality of border element processors based on, for example, administrative policy and data such as the availability of the border element processors, resource usage of the border element processors and operator preferences.

When the client sends a refresh registration request (e.g., indicating that it is here and ready for service with the managed network, for example, to receive/transmit calls) to its currently designated border element processor, the currently designated border element processor replies with a redirection message, which includes information about the newly designated border element processor and an indication/parameter that the registration is load balanced. The client then sends the registration to the newly designated border element processor together with the parameter that the registration is load balanced. The newly designated border element processor does not contact the load balancing engine because of the presence of this indicator.

The above-described techniques can be implemented in digital electronic circuitry, or in computer hardware, firmware, software, or in combinations of them. The implementation can be as a computer program product (i.e., a computer program) tangibly embodied in an information carrier (e.g., in a machine-readable storage device or in a computer readable storage medium/device/apparatus, such, as for example, memory or disks), for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/ or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. While the invention has been particularly shown and described with reference to specific illustrative embodiments, it should be understood that various changes in form and detail may be made without departing from the spirit and scope of the invention. The alternatives described herein are examples for illustration only and not to limit the alternatives in any way. The steps of the invention can be performed in a different order and still achieve desirable results.

What is claimed is:

1. A method for control of traffic entry of a managed packet network, the method comprising:
   receiving, by a first border element processor, a new registration request from a client wherein the first border element processor is one of a plurality of border element processors controlling data packets entering the managed packet network;
   generating, by the first border element processor, a first message indicative of the new active registration request associated with the client;
   transmitting, by the first border element processor, said first message to a load balancing engine, said load balancing engine coupled to and separate from said first border element processor;
   receiving, by said load balancing engine, said first message;
   load balancing, by said load balancing engine, the new active registration request across the plurality of border element processors;
   assigning, by said load balancing engine, the client to a designated border element processor; and
   generating, by said load balancing engine, a second message in response to the new activation registration request, the second message including a first parameter identifying the designated border element processor assigned to the client.

2. The method of claim 1,
   wherein the second message further comprises a second parameter identifying that the client has been load balanced; and
   wherein the method further comprises:
   transmitting said second message from said load balancing engine to the first border element processor.

3. The method of claim 2, wherein the load balancing engine is a standalone entity, the method further comprising:
   transmitting a message from the first border element processor to the client identifying the designated border element processor.

4. The method of claim 3, further comprising:
   receiving at the designated border element processor a second registration request from said client, said second registration request including an indicator indicating that the client has been load balanced by the load balancing engine.

5. The method of claim 1, further comprising:
   receiving at the designated border element processor a second registration request from said client, said second registration request including an indicator indicating that the client has been load balanced by the load balancing engine.

6. The method of claim 1, wherein load balancing the new active registration request is based on at least one of a number of active registrations on each border element processor, a capacity of each border element processor, a client usage pattern, a client class of service or an operator preference.

7. The method of claim 1, wherein load balancing comprises assigning one or more of the plurality of border element processors to the client.

8. The method of claim 1, further comprising receiving a report including a number of active registrations being handled by each of the plurality of border element processors, traffic load levels of each of the plurality of border element processors, available capacity for each of the plurality of border element processors, or any combination thereof.

9. The method of claim 1, wherein the new active registration request is associated with one or more clients.

10. The method of claim 1, further comprising:
receiving a third message reflecting a register refresh request from the client;
reassigning the client from the designated border element processor to a second designated border element processor; and
transmitting, by the load balancing engine, a fourth message to the designated border element processor to migrate the client to the second designated border element processor.

11. The method of claim 1, further comprising:
performing network initiated load balancing, by the load balancing engine, on at least one client corresponding to at least one active registration;
assigning the at least one client to a newly designated border element processor; and
transmitting, by the designated border element processor, a third message to redirect the at least one client to the newly designated border element processor.

12. The method of claim 1, further comprising performing healthchecking of the plurality of border element processors to determine if any one of the plurality of border element processors has failed or recovered.

13. The method of claim 12, further comprising receiving, from at least one of the plurality of border element processors, a third message reflecting that the at least one of the plurality of border elements processors are responsive and can handle calls for the managed packet network.

14. The method of claim 12, further comprising receiving, from at least one of the plurality of border element processors, a third message reflecting at least one of calls being handled and resource usage levels.

15. The method of claim 12, further comprising transmitting, to the plurality of border element processors, a third message requesting a response that provides information corresponding to at least one of calls being handled and resource usage levels of the plurality of border element processors.

16. The method of claim 12, further comprising:
determining that a previously failed border element processor has recovered; and
informing at least one of the plurality of border element processors to migrate at least one active registration to the recovered border element processor.

17. The method of claim 16, wherein said informing comprises transmitting a third message to migrate at least one active registration, the third message including an identifier that is at least one of an area code, a directory number, a Session Initiation Protocol uniform resource identifier (SIP URI) or TEL uniform resource identifier (TEL URI).

18. A method for control of traffic entry of a managed packet network, the method comprising:
receiving, at a border element processor, an active registration request associated with a client, wherein the border element processor is one of a plurality of border element processors controlling data packets entering the managed packet network;
determining whether the active registration request associated with the client includes a parameter identifying that the client has been previously load balanced by a load balancing engine, said load balancing engine being coupled to and separate from said first border element processor;
sending a reply to the client without forwarding the active registration request to the load balancing engine when the active registration request associated with the client includes the parameter identifying that the client has been previously load balanced; and
transmitting a message indicative of a new active registration request to the bad balancing engine to load balance the active registration request across the plurality of border element processors when the active registration does not include the parameter.

19. The method of claim 18, further comprising:
receiving, from the load balancing engine, a second message in response to the active registration request identifying a designated border element processor assigned to the client; and
informing the client of the designated border element processor assigned to the client.

20. The method of claim 18, further comprising transmitting, by each of the plurality of border element processors, a second message to the load balancing engine identifying a number of active registrations being handled by each of the plurality of border element processors.

21. A computer program product, tangibly embodied in a non-transitory computer readable storage medium for control of traffic entry of a managed packet network, the computer program product including instructions operable to cause a load balancing apparatus to:
receive, from a border element processor, a first message indicative of a new active registration request associated with a client, wherein the border element processor is one of a plurality of border element processors controlling data packets entering the managed packet network, said load balancing apparatus being coupled to and separate from said border element processor;
load balance the new active registration request across the plurality of border element processors;
assign the client to a designated border element processor;
generate a second message in response to the new activation registration request, the second message including a parameter identifying the designated border element processor assigned to the client; and
transmit the second message to the border element processor.

22. The computer program product of claim 21, wherein the second message further comprises a second parameter identifying that the client has been load balanced.

23. The computer program product of claim 22, further comprising:
instructions operable to cause the load balancing apparatus to:
receive load messages from each of the plurality of border element processors coupled to said load balancing apparatus, each of said received load messages indicating a number of active registrations being handled by a border element processor which sent the received load message.

24. A computer program product, tangibly embodied in a non-transitory computer readable storage medium for control of traffic entry of a managed packet network, the computer program product including instructions operable to cause a first border apparatus to:
receive an active registration request associated with a client;
determine whether the active registration request associated with the client includes a parameter identifying that the client has been previously load balanced by a load balancing engine, said load balancing engine being coupled to and separate from said first border apparatus;
send a reply to the client without forwarding the active registration request to the load balancing engine when the active registration request associated with the client includes the parameter identifying that the client has been previously load balanced;

transmit a message indicative of a new active registration request to the load balancing engine to load balance the active registration request across a plurality of border element processors controlling data packets entering the managed packet network when the active registration request associated with the client does not include the parameter identifying that the client has been previously load balanced;

receive from the load balancing engine a second message including information identifying a designated border apparatus assigned by said load balancing engine to the client, said designated border apparatus being one of a plurality of border apparatuses coupled to and separate from said load balancing engine, said plurality of border apparatuses including said first border apparatus; and transmit the second message from the first border apparatus to the client identifying the designated border apparatus.

25. A managed packet network system comprising:

a plurality of border element processors for controlling data packets entering the managed packet network, each border element processor configured to:

receive a new active registration request associated with a client; and transmit a first message indicative of the new active registration request;

a load balancing engine coupled to and separate from said plurality of border element processors configured to:

receive the first message indicative of the new active registration request associated with the client;

load balance the new active registration request across the plurality of border element processors;

assign the client to a designated border element processor; and generate a second message in response to the new active registration request, the second message including a first parameter identifying the designated border element processor assigned to the client.

26. The managed packet network system of claim 25, wherein the load balancing engine is centralized and the load balancing engine and the plurality of border element processors exist on different respective network devices.

27. The managed packet network system of claim 25, wherein the second message further comprises a second parameter identifying that the client has been load balanced; and transmitting said second message from said load balancing engine to the client via one of said border element processors in said plurality of border element processors.

* * * * *